(12) United States Patent
Nicholls

(10) Patent No.: US 6,245,139 B1
(45) Date of Patent: Jun. 12, 2001

(54) ELECTROSTATIC DEPOSITION

(75) Inventor: Stephen Lansell Nicholls, Adelaide (AU)

(73) Assignee: Tonejet Corporation Pty LTD, Eastwood (AU)

( * ) Notice: Subject to any disclaimer, the term of this patent is extended or adjusted under 35 U.S.C. 154(b) by 0 days.

(21) Appl. No.: 09/311,594

(22) Filed: May 14, 1999

Related U.S. Application Data

(63) Continuation-in-part of application No. PCT/AU97/00722, filed on Oct. 30, 1997.

(30) Foreign Application Priority Data

Nov. 19, 1996 (AU) .................................................. PO 3708

(51) Int. Cl.$^7$ .................................................. C09D 11/00
(52) U.S. Cl. .................................. 106/31.92; 106/31.27; 106/31.3; 106/31.31; 106/31.41; 106/31.57; 106/31.58; 106/31.6; 106/31.61; 106/31.62; 106/31.85; 106/31.86; 106/31.88
(58) Field of Search .............................. 106/31.92, 31.27, 106/31.3, 31.31, 31.41, 31.57, 31.58, 31.6, 31.62, 31.61, 31.73, 31.85, 31.86, 31.88

(56) References Cited

U.S. PATENT DOCUMENTS

| 5,453,121 | * | 9/1995 | Nicholls et al. | .................. | 106/31.92 |
| 5,591,557 | * | 1/1997 | Lawson et al. | ....................... | 430/115 |
| 5,612,162 | * | 3/1997 | Lawson et al. | ....................... | 430/113 |
| 5,800,600 | * | 9/1998 | Lima-Marques et al. | ........ | 106/31.61 |

FOREIGN PATENT DOCUMENTS

| 78847/94 | 1/1995 | (AU) . |
| 0 503 897 A1 | 9/1992 | (EP) . |
| WO 95/01404 | 1/1995 | (WO) . |
| WO 96/02598 | 2/1996 | (WO) . |
| WO 96/10058 | 4/1996 | (WO) . |
| WO 97/23575 | 7/1997 | (WO) . |

* cited by examiner

Primary Examiner—Helene Klemanski
(74) Attorney, Agent, or Firm—Evenson, McKeown, Edwards & Lenahan, P.L.L.C.

(57) ABSTRACT

A deposition material for an electrostatic deposition apparatus such as an ink for an electrostatic ink jet printer, the material comprising a carrier liquid having insulative properties, a charging agent which is soluble in the carrier liquid, and a charge augmenting additive which is soluble in the carrier liquid. The charge augmenting additives are carrier soluble materials that assist in the dissociation of the charging agent. Generally it is found that they are materials which contain nitrogen groups, e.g. amine functionality.

23 Claims, No Drawings

ELECTROSTATIC DEPOSITION

This Application is a continuation-in-Part of PCT/AU97/00722 filed Oct. 30, 1997.

TECHNICAL FIELD

This invention relates to deposition of materials by electrostatic means and particularly by droplet deposition.

BACKGROUND ART

Patent Co-operation Treaty publication No. WO93/11866 discloses an apparatus and method for deposition of droplets, for instance for printing, using a high resistivity carrier and chargeable particles in the carrier. The particles agglomerate during droplet formation and can be ejected from an ejection location on demand.

Deposition materials or inks for such equipment are disclosed in Patent Co-operation Treaty publication Nos. WO95/011414 and WO96/10058. All of these deposition materials or inks have particles of insoluble material which are agglomerated in the ejection apparatus using electrostatic forces.

It is now surprisingly been found that it is possible to prepare deposition materials, such as inks, which do not contain insoluble particles but which contain active or desired ingredients in solution which may also be ejected as droplets on demand from an apparatus of the type as discussed above.

It is an object of this invention therefore to provide inks which do not contain particles but which can be ejected from the apparatus discussed above.

DISCLOSURE OF THE INVENTION

In one form therefore the invention is said to reside in a deposition material for an electrostatic deposition apparatus, the material comprising a carrier liquid having insulative properties, a charging agent which is soluble in the carrier liquid, and a charge augmenting additive which is soluble in the carrier liquid.

In an alternate form the invention is said to reside in an ink for an electrostatic ink jet printer comprising a carrier liquid having insulative properties, a charging agent which is soluble in the carrier liquid, and a charge augmenting additive which is soluble in the carrier liquid and a toning agent.

These deposition materials or inks may be described as particle-less inks and they generally contain materials which are completely soluble in the chosen insulative carrier media and which appear to undergo some degree of ionisation in the solvent thus creating a charge carrier in the ink. These inks are made to eject from the apparatus discussed above on application of an electric field. Furthermore drop ejection is controllable by voltage modulation (pulsing) such that the ejection is of a drop-on-demand type.

The particle-less deposition materials or inks of the present invention may be useful for delivering, printing or applying any material that is soluble in the insulative solvent of the ink. Possible applications include printing using soluble dyes such as for the printing of fabrics, platemaking for printing processes where resin solutions for instance can be printed, varnishing for instance applying a gloss overcoat on prints using resin solutions, pharmaceutical dosage because of the ability to control the number of drops and security printing such as printing UV fluorescent dyes.

In a particular application the printing ink of the present invention can be used in combination with a colour printing process to provide a impermeable coating over a picture being printed.

In one preferred embodiment, the carrier liquid may comprise the active or desired ingredient in the printing process or there may be further included a further active ingredient which is also soluble in the carrier liquid. An example of a carrier liquid which is itself the desired active ingredient may be a resin which can be polymerised after deposition.

Where there is an added active ingredient the active ingredient may be those materials to be printed for a given application. Materials may be added to the carrier liquid to impart some feature to the printed ink deposit such as colour, adhesion, gloss, durability, electrical resistance and pharmacology. Examples include colour dyestuffs, fluorescent dyes, resins, adhesives, optical brighteners and pharmaceuticals.

One theory to which the applicants do not wish to be bound by which it is suggested that the present invention operates is that the charge augmenting additive enhances the kinetics of dissociation of the charging agent. Charging agents are added to the carrier liquid to introduce ionic species to the non-aqueous ink carrier liquid thereby increasing the mobility of the ink under the influence of an applied electric field and it has been found experimentally that the addition of a charge augmenting additive increases the degree of ionisation.

For instance, in the case of the preferred "metal soap" charging agents, the mechanism of charging appears to involve the formation of structures known as inverse micelles. These inverse micelles can undergo ionic dissociation whereby pairs of oppositely charged inverse micelles are formed, thereby forming ionic species within the carrier liquid. It has been found that the level of inverse micelle dissociation is dramatically increased in the presence of charge augmenting additives. The exact mechanism for this charge enhancement is unclear, however, it is thought that these additives introduce active sites whereby the kinetics of inverse micelle dissociation are significantly improved.

The carrier liquid may be any suitable liquid with the characteristics of a high resistivity and in which the charging agent and charge augmented additive as well as any active ingredient is soluble. The carrier liquid may include aliphatic hydrocarbons such as hexane, cyclohexane, isodecane, Isopar (manufactured by Exxon) and Shellsol T (manufactured by Shell); aromatic hydrocarbons such as xylene, toluene and Solvesso 100 (manufactured by Exxon); chlorinated solvents such as diethylene chloride and chloroform; silicone oils such as dimethyl polysiloxane such as DC 200 (manufactured by Dow Corning) and the cyclic dimethyl polysiloxane such as DC 345 (manufactured by Dow Corning); monomer liquids such as esters of acrylic acid, esters of methacrylic acid and vinyl acetate and vegetable oils such as olive, safflower, sunflower, soya and linseed oil.

The charging agent may be any material that is soluble in the carrier liquid and that is capable of undergoing dissociation in non-aqueous media to form ionic species. Examples of such agents include metal salts such as lithium, cadmium, calcium, manganese and magnesium salts of heptanoic acid as well as zirconium, aluminium, cobalt and magnesium salts of 2-ethyl hexanoic acid.

The charge augmenting additives are carrier soluble materials that assist in the dissociation of the charging agent. A common feature of these charge augmenting additives is that they usually contain nitrogen groups (e.g. amine functionality).

Examples of these materials have been found to be:

Acryloid 958, Acryloid 917. These are polymeric oil additives made by Rohm and Haas.
OLOA 1200. This is a low molecular weight polyisobutylene succinimide made by Chevron Chemical Company.
Antaron V220, Antaron V216. These are alkylated poly vinyl pyrrolidones made by Gaf Chemicals.
Soy Lecithin. This is an oil soluble lecithin made by ICI Chemicals.
FOA-2. This is a petroleum additive made by Du Pont Chemicals and Pigments and consists of a methacrylate polymer.

There may be further included in the deposition material or ink formulation according to this invention further compounds such as property modifying agents. Such materials can be used to modify the physical properties of the deposition material or ink, including surface tension and viscosity, such that ink print performance is enhanced. Examples of suitable materials are: resins and polymers such as modified rosin esters, acrylic resins, vinyl resins and hydrocarbon resins; waxes such as polyethylene wax, hydrogenated castor oil, ester wax and paraffin wax; surface active agents including detergents, wetting agents and emulsifiers. Preservatives may also be included in the deposition material or ink.

This then generally explains the invention but to assist with understanding reference will now be made to a number of examples of formulation of deposition materials or inks.

EXAMPLES

The following examples of deposition materials or inks according to the present invention were made by weighing all materials into a suitable glass container and mixing by agitation.

Example 1 is the carrier liquid only;

Example 2 is a carrier liquid with a charging agent;

Examples 3, 5, 7, 9 and 11 are of a carrier liquid with a charge augmenting additive; and Examples 4, 6, 8, 10 and 12 are of a carrier liquid with various concentrations of charging agent and charge augmenting additive.

The formulations are as set out in Table 1.

TABLE 1

| Example No. | Isopar G | Nuxtra 6% Zr | FOA2 | Antaron V220 | Soy Lecithin | OLOA 1200 | Acryloid 958 |
|---|---|---|---|---|---|---|---|
| 1 | 200 g | | | | | | |
| 2 | 198 g | 2 g | | | | | |
| 3 | 196 g | | 4 g | | | | |
| 4 | 194 g | 2 g | 4 g | | | | |
| 5 | 196 g | | | 4 g | | | |
| 6 | 194 g | 2 g | | 4 g | | | |
| 7 | 196 g | | | | 4 g | | |
| 8 | 194 g | 2 g | | | 4 g | | |
| 9 | 196 g | | | | | 4 g | |
| 10 | 194 g | 2 g | | | | 4 g | |
| 11 | 196 g | | | | | | 4 g |
| 12 | 194 g | 2 g | | | | | 4 g |

Isopar G is an isoparaffinic solvent made by Exxon Chemical

Nuxtra 6% Zr is a solution of zirconium octanoate in white spirits made by Hüls America Inc.

Acryloid 958 is a polymeric oil additives made by Rohm and Haas.

OLOA 1200 is a low molecular weight polyisobutylene succinimide made by Chevron Chemical Company Antaron V220 is an alkylated poly vinyl pyrrolidone made by Gaf Chemicals Soy Lecithin is an oil soluble lecithin made by ICI Chemicals FOA-2 is a petroleum additive made by Du Pont Chemicals and Pigments These solutions were then measured for their electrical conductivity using a Scientifica Conductivity Meter Model 627. The results for these are as set out in Table 2.

TABLE 2

| Example No. | Conductivity (pico Siemens) |
|---|---|
| 1 | 0.07 |
| 2 | 20.2 |
| 3 | 1.76 |
| 4 | 79.3 |
| 5 | 156.4 |
| 6 | 12,390 |
| 7 | 1,184 |
| 8 | 2,130 |
| 9 | 115.3 |
| 10 | 6,700 |

TABLE 2-continued

| Example No. | Conductivity (pico Siemens) |
|---|---|
| 11 | 3.32 |
| 12 | 1,482 |

It can be clearly seen that the conductivity of those examples containing both charging agent and charge augmenting additive (Examples 4, 6, 8, 10 and 12) is significantly greater than those base on changing agent or change augmenting additive only.

Deposition material or inks described in examples 1–12 were then evaluated for print performance using the ink jet printing device described in PCT publication No. WO93/11866 and the results shown in Table 3. This device was operated at a drive frequency of 2.5 kHz with a maximum ejection voltage of +2400 volts.

TABLE 3

| Example | observed droplet ejection |
|---|---|
| 1 | no |
| 2 | no |
| 3 | no |
| 4 | yes |
| 5 | no |
| 6 | yes |
| 7 | no |
| 8 | yes |
| 9 | no |
| 10 | yes |
| 11 | no |
| 12 | yes |

Deposition material and ink formulations were prepares to test printing ability.

Example 13

| | |
|---|---|
| Isopar G | 85 g |
| *Nuxtra 6% Zr | 1 g |
| **Antaron V220 | 2 g |
| Piccotex LC | 15 g |

Piccotex LC is an α—methyl styrene polymer made by Hercules Inc., USA

The above materials were mixed together in a glass beaker to make a clear, colourless solution. This deposition material was tested in the ink jet printing device described in PCT publication No. WO93/11866 to image copy bond paper using drive conditions of 2.5 kHz and 2200 v. The image was allowed to air dry, whereupon a clear, hard deposit of the Piccotex resin remained. This deposition material may be used as a clear overcoat for protecting and enhancing the gloss appearance of any underlying substrate.

Example 14

| | |
|---|---|
| Isopar G | 43.65 g |
| Xylene | 43.65 g |
| Piccotex LC | 9.70 g |
| Uvitex | 0.5 g |

-continued

| Example 14 | |
|---|---|
| *Nuxtra 6% Zr | 1 g |
| **Acryloid 958 | 2 g |

*Charging agent
**Charge augmenting agent

The above materials were mixed together in a glass beaker to make a clear, slightly straw coloured solution. This ink was tested in the ink jet printing device described in PCT publication No. WO93/11866 to image copy bond paper using drive conditions of 2.5 kHz and 2200 v. The image was allowed to air dry, whereupon a clear, transparent image deposit remained. This transparent image was difficult to view by daylight illumination, however, the image was rendered visible under irradiation by UV light. This ink may be useful for the purpose of security printing.

*Charging agent

**Charge augmenting agent

Uvitex is a fluorescent optical brightener made by Ciba Geigy.

Example 15

| Example 15 | |
|---|---|
| Linseed oil | 100 g |
| *Texipol 10% Co | 1 g |
| *Nuxtra 6% Zr | 1 g |
| **Acryloid 958 | 2 g |

*Charging agent
**Charge augmenting agent
Uvitex is a fluorescent optical brightener made by Ciba Geigy.

The above materials were mixed together in a glass beaker to make a clear, slightly straw coloured solution. This deposition material was tested in the ink jet printing device described in PCT publication No. WO93/11866 to image polyester film using conditions of 2.5 kHz and 2600 v. The image was allowed to air dry. It was then heated in an oven for 3 hours, whereupon the linseed oil carrier was polymerised to a hard, clear deposit. This deposition material may be useful for applying as a finish varnish for the purpose of improving the appearance and protection of any number of different types of substrate articles.

*Charging agent

**Charge augmenting agent

Texipol 10% Co is a solution of cobalt octoate in white spirits made by Harcros Chemical Group Throughout this specification various indications have been given as to the scope of this invention but the invention is not limited to any one of these but may reside in two or more of these combined together. The examples are given for illustration only and not for limitation.

Throughout this specification unless the context requires otherwise, the words 'comprise' and 'include' and variations such as 'comprising' and 'including' will be understood to imply the inclusion of a stated integer or group of integers but not the exclusion of any other integer or group of integers.

What is claimed is:

1. A liquid deposition material for an electrostatic deposition apparatus, the material comprising a carrier liquid having insulative properties, a charging agent which is soluble in the carrier liquid, and a charge augmenting additive which is soluble in the carrier liquid.

2. An ink for an electrostatic ink jet printer comprising a carrier liquid having insulation properties, a charging agent which is soluble in the carrier liquid, a charge augmenting additive which is soluble in the carrier liquid and a soluble toning agent.

3. A deposition material or ink for an electrostatic deposition apparatus as in claim 1 or claim 2 wherein the carrier liquid is the active or desired ingredient in the deposition or printing process.

4. A deposition material or ink for an electrostatic deposition apparatus as in claim 1 or claim 2 further including an active ingredient which is also soluble in the carrier liquid.

5. A deposition material or ink for an electrostatic deposition apparatus as in claim 4 wherein the active ingredient is selected from the group consisting of color dyestuffs, fluorescent dyes, resins, adhesives, optical brighteners and pharmaceuticals.

6. A deposition material or ink for an electrostatic deposition apparatus as in claim 1 or claim 2 wherein the carrier liquid is selected from the group consisting of aliphatic hydrocarbons, aromatic hydrocarbons, chlorinated solvents, silicone oils, monomer liquids and vegetable oils.

7. A deposition material or ink for an electrostatic deposition apparatus as in claim 1 or claim 2 wherein the charging agent is a metal salt.

8. A deposition material or ink for an electrostatic deposition apparatus as in claim 1 or claim 2 wherein the charge augmenting additives are carrier soluble materials that assist in the dissociation of the charging agent and that they contain nitrogen groups.

9. A deposition material or ink for an electrostatic deposition apparatus as in claim 1 or claim 2 wherein the charge augmenting additive is selected from the group consisting of polymethacrylates, polyisobutylene succinimide, alkylated polyvinyl pyrrolidones and soy lecithin.

10. A deposition material or ink for an electrostatic deposition apparatus as in claim 1 or claim 2 further including property modifying agents selected from the group consisting of resins and polymers, waxes, surface active agents and preservatives.

11. A deposition material or ink for an electrostatic deposition apparatus as in claim 6, wherein the aliphatic hydrocarbons are selected from the group consisting of hexane, cyclohexane, iso-decane and isoparaffins.

12. A deposition material or ink for an electrostatic deposition apparatus as in claim 6, wherein the aromatic hydrocarbons are selected from the group consisting of xylene and toluene.

13. A deposition material or ink for an electrostatic deposition apparatus as in claim 6, wherein the chlorinated solvents are selected from the group consisting of diethylene chloride and chloroform.

14. A deposition material or ink for an electrostatic deposition apparatus as in claim 6, wherein the silicone oils are selected from the group consisting of dimethyl polysiloxane and cyclic dimethyl polysiloxane.

15. A deposition material or ink for an electrostatic deposition apparatus as in claim 14, wherein the dimethyl polysiloxane is hexamethyl disiloxane.

16. A deposition material or ink for an electrostatic deposition apparatus as in claim 14, wherein the cyclic dimethyl polysiloxane is polydimethyl cyclosiloxane.

17. A deposition material or ink for an electrostatic deposition apparatus as in claim 6, wherein the monomer liquids are selected from the group consisting of esters of acrylic acid, esters of methacrylic acid and vinyl acetate.

18. A deposition material or ink for an electrostatic deposition apparatus as in claim 6, wherein the vegetable oils are selected from the group consisting of olive, safflower, sunflower, soya and linseed oil.

19. A deposition material or ink for an electrostatic deposition apparatus as in claim 7, wherein the metal salt is selected from the group consisting of lithium, cadmium, calcium, manganese, magnesium salts of heptanoic acid, zirconium, aluminum, cobalt and magnesium salts of 2-ethyl hexanoic acid.

20. A deposition material or ink for an electrostatic deposition apparatus as in claim 10, wherein the resins and polymers are selected from the group consisting of modified rosin esters, acrylic resins, vinyl resins and hydrocarbon resins.

21. A deposition material or ink for an electrostatic deposition apparatus as in claim 10, wherein the waxes are selected from the group consisting of polyethylene wax, hydrogenated castor oil, ester wax and paraffin wax.

22. A deposition material or ink for an electrostatic deposition apparatus as in claim 10, wherein the surface active agents are selected from the group consisting of detergents, wetting agents and emulsifiers.

23. A liquid deposition material for an electrostatic deposition apparatus, the material comprising:
a carrier liquid having insulation properties;
a charging agent which is soluble in the carrier liquid;
a charge augmenting additive which is soluble in the carrier liquid; and
a soluble toning agent.

* * * * *